United States Patent
Organek et al.

(10) Patent No.: US 6,666,315 B2
(45) Date of Patent: Dec. 23, 2003

(54) BALL RAMP CLUTCH WITH INDEXING PLATES

(75) Inventors: Gregory J. Organek, Whitefish Bay, WI (US); David M. Preston, Clarkston, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 10/143,323

(22) Filed: May 9, 2002

(65) Prior Publication Data

US 2003/0209400 A1 Nov. 13, 2003

(51) Int. Cl.[7] .......................... F16D 27/115; F16D 15/00
(52) U.S. Cl. ...................... 192/84.7; 192/35; 192/84.91; 192/84.93; 192/84.96
(58) Field of Search ...................... 192/35, 84.7, 84.91, 192/84.93, 84.96, 40, 70.23, 93 A

(56) References Cited

U.S. PATENT DOCUMENTS

| | | | |
|---|---|---|---|
| 1,974,390 A | 9/1934 | Eason | |
| 2,045,086 A | 6/1936 | Kastner | |
| 2,091,270 A | 8/1937 | Colman | |
| 2,605,877 A | 8/1952 | Winther | |
| 2,649,941 A | 8/1953 | Doebeli | |
| 2,738,045 A | 3/1956 | Mergen et al. | |
| 2,816,636 A | 12/1957 | Weibel, Jr. | |
| 2,861,225 A | 11/1958 | Mergen | |
| 2,933,171 A | 4/1960 | Kraeplin | |
| 2,937,729 A | 5/1960 | Sperr, Jr. | |
| 3,000,479 A | 9/1961 | Mosbacher | |
| 4,286,701 A | 9/1981 | MacDonald | |
| 4,415,073 A | 11/1983 | Campbell et al. | |
| 4,645,049 A | 2/1987 | Matsuda et al. | |
| 4,718,303 A | 1/1988 | Fogelberg | |
| 4,850,458 A | 7/1989 | Allan | |
| 4,878,567 A | 11/1989 | Buckley et al. | |
| 4,898,265 A | 2/1990 | Metcalf | |
| 4,909,363 A | 3/1990 | Trommer | |
| 5,070,975 A | 12/1991 | Tanaka et al. | |
| 5,078,249 A | 1/1992 | Botterill | |
| 5,092,825 A | 3/1992 | Goscenski, Jr. et al. | |
| 5,106,349 A | 4/1992 | Botterill et al. | |
| 5,160,004 A | 11/1992 | Scott et al. | |
| 5,199,538 A | 4/1993 | Fischer et al. | |
| 5,435,201 A | 7/1995 | Preston et al. | |
| 5,441,137 A | 8/1995 | Organek et al. | |
| 5,469,948 A | 11/1995 | Organek et al. | |
| 5,485,904 A | 1/1996 | Organek et al. | |
| 5,499,951 A | 3/1996 | Showalter | |
| 5,505,285 A | 4/1996 | Organek | |
| 5,528,950 A | 6/1996 | Organek et al. | |
| 5,638,933 A | 6/1997 | Matsumoto et al. | |
| 5,651,437 A | 7/1997 | Organek et al. | |
| 5,713,445 A | 2/1998 | Davis et al. | |
| 5,713,446 A | 2/1998 | Organek et al. | |
| 5,802,915 A | 9/1998 | Organek et al. | |

(List continued on next page.)

FOREIGN PATENT DOCUMENTS

| | | |
|---|---|---|
| CA | 1 123 765 | 5/1982 |
| DE | 42 07 640 A1 | 9/1993 |
| GB | 2 235 957 B | 6/1993 |
| GB | 2 315 531 A | 2/1998 |

Primary Examiner—Rodney H. Bonck
(74) Attorney, Agent, or Firm—Loren H. Uthoff, Jr.

(57) ABSTRACT

A driveline master clutch assembly is disclosed where a unidirectional ball ramp mechanism is used to apply a clamping load to a clutch pack for frictionally coupling a prime mover such as an engine to a gear change transmission. The ball ramp mechanism includes index plates to limit the rotation of a control ring and an activation ring such that the energized ball ramp mechanism increases in separation distance to increase the clamping force on the clutch pack whenever there is slippage in the clutch pack irregardless of the direction of torque flow through the master clutch assembly.

30 Claims, 7 Drawing Sheets

U.S. PATENT DOCUMENTS

| | | |
|---|---|---|
| 5,810,141 A | 9/1998 | Organek et al. |
| 5,819,883 A | 10/1998 | Organek et al. |
| 5,910,061 A | 6/1999 | Organek et al. |
| 5,911,643 A | 6/1999 | Godlew et al. |
| 5,947,857 A | 9/1999 | Organek et al. |
| 5,953,959 A | 9/1999 | Organek et al. |
| 5,954,173 A | 9/1999 | Sakai et al. |
| 5,960,916 A | 10/1999 | Organek et al. |
| 5,964,330 A | 10/1999 | Organek et al. |
| RE36,502 E | 1/2000 | Organek et al. |
| 6,082,504 A | 7/2000 | Organek et al. |
| 6,098,770 A * | 8/2000 | Isley, Jr. .................. 192/35 |
| 6,109,408 A | 8/2000 | Ikeda et al. |
| 6,250,445 B1 | 6/2001 | Davis |
| 2003/0094343 A1 * | 5/2003 | Showalter .................. 192/35 |

* cited by examiner

BALL RAMP CLUTCH WITH INDEXING PLATES

RELATED APPLICATIONS

This application is related to U.S. Pat. No. 6,561,332 entitled Ball Ramp Clutch With Frictional Damping and U.S. Ser. No. 10/143,324 entitled Ball Ramp Actuator With Indexing Plates and U.S. Ser. No. 10/143,337 entitled Lubrication System for Ball Ramp Clutch System, all of which are assigned to the same assignee, Eaton Corporation, as this application.

FIELD OF THE INVENTION

The present invention relates to a vehicle driveline master clutch which utilizes a ball ramp mechanism to load a clutch pack and more specifically to a vehicle driveline master clutch which utilizes a ball ramp mechanism to load a clutch pack where the relative rotation of the ball ramp mechanism within the clutch is controlled through indexing plates to provide proper clutch actuation irregardless of the direction of torque flow through the driveline.

PRIOR ART

Driveline master clutches commonly use a plurality of springs to clamp one or more friction discs to an engine flywheel, where the clamping springs are normally disposed within a pressure plate assembly which is bolted to the flywheel. The friction discs are splined to rotate with a transmission input shaft which, when rotated and clamped to the flywheel provide motive power to the driveline and wheels of the vehicle. A mechanical linkage operated by a driver/operator is used to control the engagement and disengagement of the master clutch.

Efforts to automate the operation of the master clutch to eliminate the need for driver intervention are currently underway. Thus, it is known to make use of a hydraulic actuator or an electric motor actuator to operate the master clutch release mechanism in response to a control signal generated by a control microprocessor which processes a multiplicity of sensor outputs which are used to determine the vehicle operating conditions and hence the desired operation of the master clutch. Furthermore, the use of a ball ramp actuator to operate a driveline master clutch is known in the art. U.S. Pat. Nos. 5,441,137; 5,469,948; 5,505,285; 5,651,437; 5,810,141; 5,910,061; 5,964,330; and RE 36,502 assigned to the same assignee as this application, all of which are hereby expressly incorporated by reference, disclose methods of using a ball ramp actuator to supply the clamping force on a clutch disc and could, in the alternative, be used to supply a release force against a clutch apply spring.

Typically, a ball ramp actuator is activated when an electrical current is supplied to a coil thereby producing an electromagnetic field in a coil pole which applies a retarding force to an armature which rotates with an input shaft. The rotating armature is nonrotatably connected to an annular control ring which has a plurality of control ramps or grooves formed in the face of a control ring which vary in axial depth. An annular activation ring which rotates with an output shaft has a like number of variable depth activation grooves formed therein which oppose those formed in the control ring where a corresponding number of rolling elements are trapped between the control and activation grooves. As a retarding force is applied to the control plate by the armature, the rotational movement of the control ring relative to the activation ring causes the rolling elements to simultaneously traverse the control grooves and the activation grooves thereby causing an increase in separation distance between the control and activation rings which is used to provide a clamping force on a clutch friction disc.

Also shown in the prior art are other types of vehicle driveline devices which make use of a ball ramp mechanism to provide a clamping load on a clutch pack. U.S. Pat No. 5,092,825 discloses a limited slip differential having a clutch pack loaded by a ball ramp actuator. U.S. Pat. No. 5,499,951 discloses a driveline transfer case where the torque split is controlled by a ball ramp actuator. U.S. Pat. No. 5,528,950 discloses a transmission inertia brake where a ball ramp actuator loads a clutch pack to slow the rotation of a spinning transmission shaft. U. S. Pat. No. 5,819,883 discloses a driveline retarder in which a ball ramp actuator is used to load a clutch pack to rotate a hydraulic pump in response to a signal from a control unit. The disclosures of U.S. Pat. Nos. 5,092,825; 5,499,951; 5,528,950 and 5,819, 883 are all hereby incorporated herein by reference.

The prior art ball ramp actuators used in the operation of the master clutch or other driveline coupling system such as a differential or transfer case could be improved by improving the inherent mechanical stability of the ball ramp. It would also be an advantage if the master clutch remained fully engaged irregardless of the direction of the flow of torque through the clutch. Unidirectional grooves in the ball ramp mechanism could provide for increased separation distance capability since the axial depth variation in the grooves can be made greater because twice as much length is available as compared to a bi-directional groove. However, prior art ball ramp actuated driveline clutches cannot provide continuous engagement and increasing clamping force as the torque through the clutch is reversed, such as when a vehicle transitions from drive to coast modes.

SUMMARY OF THE INVENTION

The present invention results in an improvement in the operational characteristics of a ball ramp actuator which can be used in a variety of vehicle driveline applications to provide a clamping load on a frictional clutch pack. The present invention provides for the same unidirectional apply ball ramp mechanism functionality as disclosed in U.S. Ser. No. 09/940,821, assigned to the same assignee as this application, without the use of one-way clutches. The present invention makes use of separate index plates to control the direction of rotation of both the control ring and the activation ring functioning similar to the one-way clutches which they replace. In this manner, the reliability of the clutch is improved while manufacturing costs are reduced.

As taught in the U.S. Ser. No. 09/940,821 application, one-way clutches can be used to control the rotational direction of the control ring and control plate where the control plate can also function as a coil armature and the rotational direction of the activation ring and activation plate to provide a continuous clutch apply function using unilateral grooves in the control ring and activation ring where the clutch pack clamping force is maintained irregardless of the direction of the flow of torque through the clutch assembly. However, one-way clutches are expensive and not as reliable as the other clutch components and the use of the index plates of the present invention in place of the one-way clutches results in a cost reduction with improved reliability.

The present invention provides the basic function of the one-way clutches using index plates which function to limit the degree of rotation of the control ring and the activation ring. The rotation limitation provided by the index plates is not identical to that provided with the one-way clutches, but for this many applications of a ball ramp mechanism, such as where it used to apply a clamping load to a clutch pack in a driveline master clutch, the functionality of the index plates is satisfactory. Specifically, a one-way clutch will lock-up during counter rotation after a relatively small degree of rotation (on the order of one degree) while the index plates of the present invention can allow as much as 240 degrees of rotation prior to lock-up depending on travel required. When the rolling elements of the ball ramp mechanism are at the bottom of their respective ramps, both index plates are against their respective stops formed in the control ring and the activation ring so that any differential rotation between the output shaft and the input shaft will result in an increase in separation distance in the ball ramp mechanism to increase the clamp load on the clutch pack.

Thus, the present invention improves the performance and durability of a ball ramp actuated master clutch assembly by eliminating the need for one-way clutches. Indexing plates are used to limit the relative rotational travel of the control ring and the actuation ring of the ball ramp actuator which is used to apply an axial clamping load on a clutch pack. One indexing plate limits the rotation of the control ring of the ball ramp mechanism and a second indexing plate limits the rotation of the activation ring. Using the indexing plates of the present invention, the ball ramp mechanism, when energized, can only further compress the clutch pack with any degree of clutch slippage, thereby preventing any break in clutch engagement when the torque flow in the driveline reverses direction from a drive mode into a driven mode. The torque flow in the driveline is in a drive mode when the engine is supplying power to the input shaft of the clutch assembly and in a driven mode when the engine is absorbing power from the input shaft of the clutch assembly. The indexing plates do not immediately prevent rotation in an undesired direction as with the one-way clutches disclosed in U.S. Ser. No. 09/940,821 but permit limited rotation until the index plates hit against respective stops formed in the control ring and the activation ring.

To activate the ball ramp actuator an electrical current is applied to a coil assembly which generates an electromagnetic force that frictionally rotationally couples a control plate (or armature), an intermediate plate and an activation plate together. The control plate rotates with the control ring and the activation plate rotates with the activation ring. Slippage is allowed to occur between the activation plate and the intermediate plate or between the control plate and the intermediate plate as required to increase the activation level in the ball ramp mechanism. The index plates are oriented to only allow the control ring to rotate in an opposite direction from that of the activation ring. An activation plate rotates with the activation ring and is supported on the input shaft while the intermediate plate is driven by the clutch hub while the coil armature rotates with the control ring which is supported on the input shaft The present invention also results in an improvement in the operational characteristics of a ball ramp actuator which can be used in a variety of vehicle driveline applications to supply a clamping load to a frictional clutch pack. The present,invention provides a unidirectional apply ball ramp function which applies the clutch irregardless of torque flow through the clutch assembly along with significantly increased frictional damping in the ball ramp mechanism itself to control and stabilize the ball ramp mechanism thereby improving the operation of the clutch or other driveline device. The operation of the ball ramp mechanism is improved by significantly increasing the frictional damping using an intermediate plate disposed between the activation plate and the control plate where the intermediate plate rotates with the output shaft and output hub. Note that the torque flow from the input shaft to the output shaft can be reversed so that the torque flows from the output shaft to the input shaft and the ball ramp clutch assembly will continue to provide the desired functionality.

One provision of the present invention is to provide a ball ramp actuator to load a clutch pack where the clutch clamping load is maintained irregardless of the direction of the flow of torque through the clutch assembly.

Another provision of the present invention is to provide a ball ramp actuator to load a clutch pack where the clutch clamping load is maintained irregardless of the direction of the flow of torque through the clutch assembly using index plates in the ball ramp actuator.

Another provision of the present invention is to provide a ball ramp actuator to load a clutch pack where the frictional damping of the ball ramp mechanism is substantially increased to improve operation.

Still another provision of the present invention is to provide a ball ramp actuator to load a driveline master clutch having improved operational characteristics.

DETAILED DESCRIPTION OF THE PREFERRED EMBODIMENT

Figure 1:
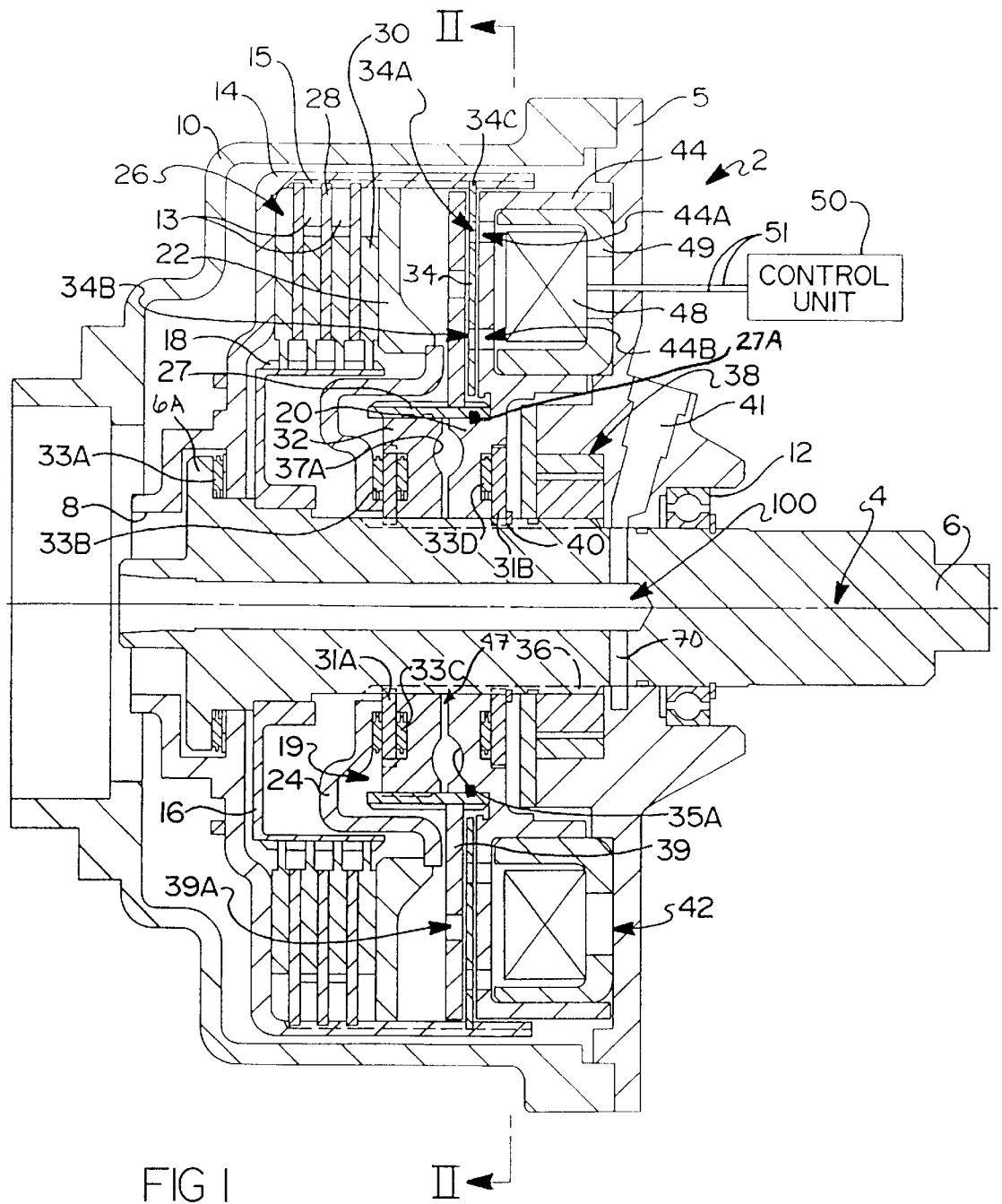
FIG. 1 is a cross-sectional view of the clutch assembly of the present invention.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Certain terminology will be used in the following description for convenience in reference only and will not be limiting. The terms "rightward" and "leftward" will refer to Fi directions in the drawings in connection with which the terminology is used. The terms "inwardly" and "outwardly" will refer to directions toward and away from, respectively, the geometric center of the apparatus. The terms "upward" and "downward" will refer to directions as taken in the drawings in connection with which the terminology is used. All foregoing terms mentioned above include the normal derivatives and equivalents thereof.

Although primarily described for use in a vehicle driveline and more specifically as part of a master clutch, the present invention can be used to rotationally connect any two rotatable shafts in response to an electronic control signal. Such alternative devices could include differentials, engine retarders, transmission brakes, foundation brakes, inertia brakes, transfer cases and other devices.

Now referring to FIG. 1 of the drawings, a cross-sectional view of the ball ramp clutch assembly 2 of the present invention is shown. An input shaft 6 which rotates about an axis of rotation 4 is normally connected to a power source such as an internal combustion engine (not shown). The clutch assembly 2 functions to frictionally rotationally link the input shaft 6 to the output shaft 8 which, for example, could be linked to the input shaft of a change gear transmission (not shown). In general, the elements which make up the clutch assembly 2 are annularly shaped and rotate about the axis of rotation 4. The face plate 5 is connected to housing 10 and together with housing 10 provides a containment and support structure for the operating elements and lubricating/cooling fluid of the clutch assembly 2. The face plate 5 is supported on the input shaft 6 through bearing 12 at it's right side, and the housing 10 is typically attached to another driveline component such as a transmission case. The output shaft 8 is then joined to another rotatable shaft, such as a transmission input shaft. The clutch hub 14 is piloted on the input shaft 6 but is nonrotatably connected to the output shaft 8. Splines 15 nonrotatably connect the output shaft 8 and clutch hub 14 to at least one driven disc 28 and also rotatably connect the hub 14 to the intermediate plate 34 through teeth 34C. Splines 18 formed on a drive hub 16 nonrotatably connect at least one drive disc 30 to the input shaft 6 since the drive hub 16 is attached to the input shaft 6. The clutch hub 14 is driven by the frictional interaction between the drive discs 30 and the driven discs 28. Annular wave springs 13 are placed between the driven discs 28 to provide a separation force so that the drive discs 30 and the driven discs 28 separate when the clutch assembly 2 is disengaged to reduce clutch drag in the clutch pack 26.

Figure 3:
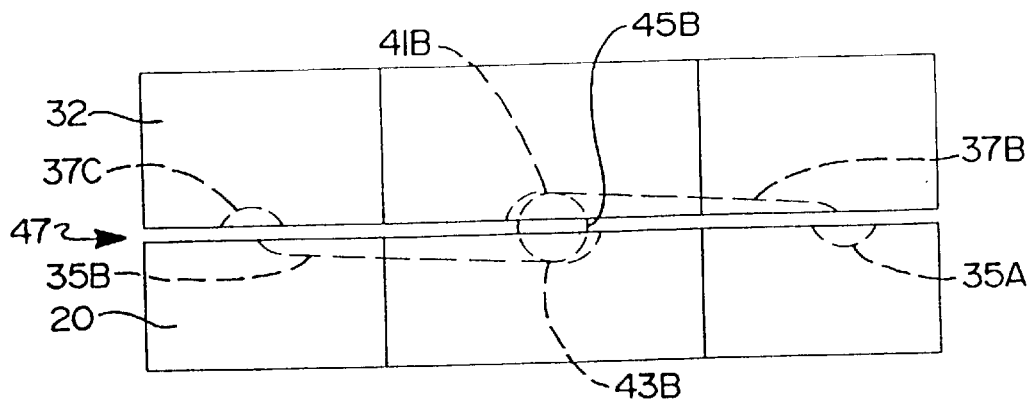
FIG. 3 is an illustrative partial view of the ball ramp mechanism in a nonactivated state taken along line III—III of FIG. 2.
Figure 4:
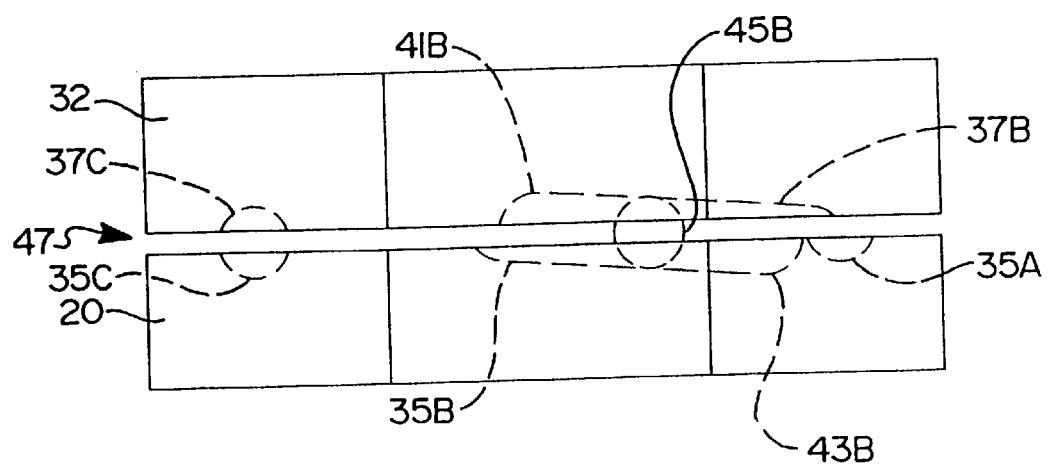
FIG. 4 is an illustrative partial view of the ball ramp mechanism in an activated state taken along line III—III of FIG. 2.

The ball ramp mechanism 19 is comprised of a control ring 20, an activation ring 32 and a plurality of rolling elements 45A, 45B, 45C (see FIGS. 3 and 4) positioned to engage and roll along opposed variable depth grooves 35A, 35B, 35C and 37A, 37B, 37C formed in both the control ring 20 and the activation ring 32, respectively (see FIGS. 3 and 4). As the control ring 20 is rotated relative to the activation ring 32, the rolling elements 45A, 45B, 45C transverse the opposed control ring grooves 35A, 35B, 35C and activation ring grooves 37A, 37B, 37C either increasing or decreasing the separation distance 47 between the control ring 20 and the activation ring 32 depending on the direction of the relative rotation.

The thrust bearings 33A, 33B, 33C and 33D axially position of various components contained in the clutch assembly 2. The input shaft flange 6A is axially located by the thrust bearing 33A. The first index plate 31A is axially supported through the thrust bearings 33B and 33C and the control ring 20 is axially supported through the thrust bearing 33D acting against the second index plate 31B which contacts the snap ring 40.

The second index plate 31B limits rotation of the control ring 20 when the first index step 46A contacts the first control stop 52A or when the second index step 46B contacts the second control stop 52B. Activation plate 39 is rotationally joined to the input shaft 6 via the index plate 31B which in one mode, is against a stop 52A and the control ring 20 and the activation ring 32 are positioned such that the rolling elements 45A, 45B, 45C are at the bottom of their respective grooves while the second index plate is on its stop 56B but in the opposite direction.

Figure 5:
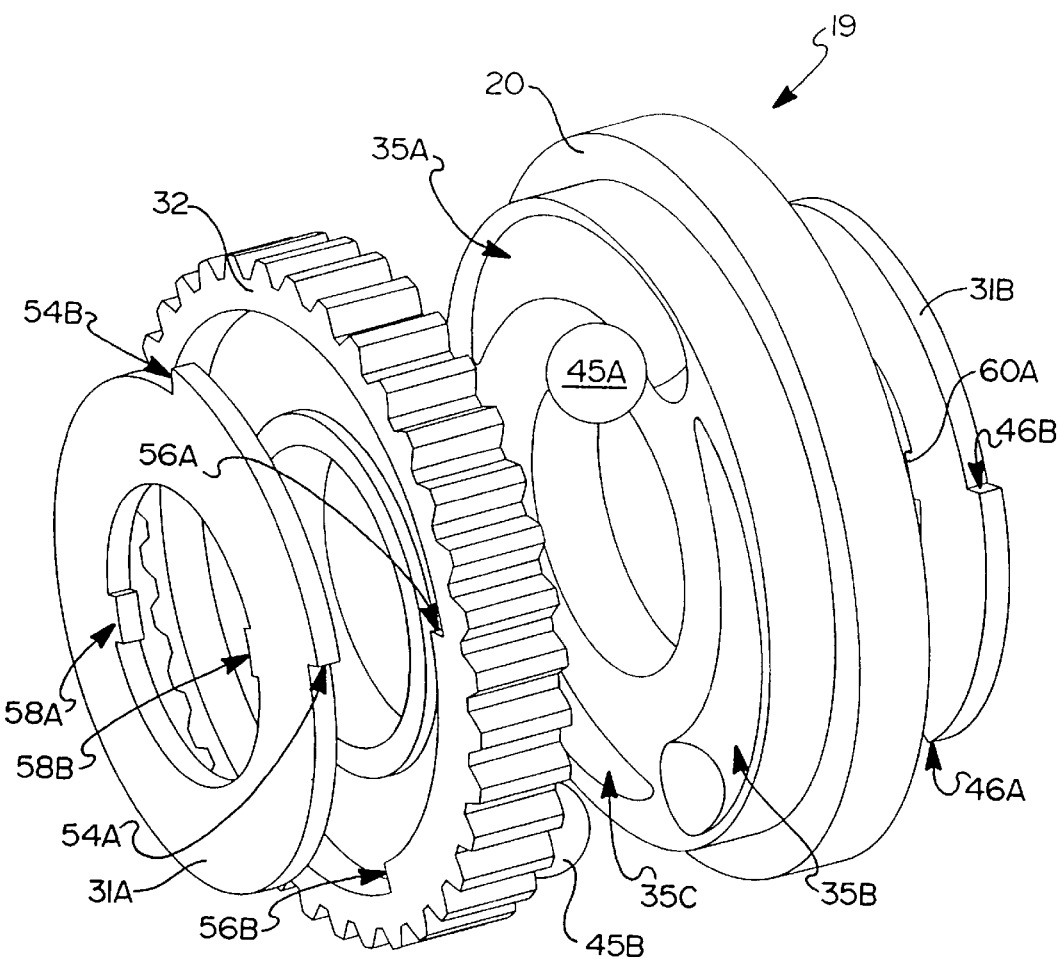
FIG. 5 is a perspective view of the ball ramp mechanism and the indexing plates of the clutch assembly of FIG. 1.

In a similar manner to the operation of the second index plate 31B, the first index plate 31A limits the rotation of the activation ring 32 relative to the input shaft 6 when the first index step 54A contacts the first activation stop 56A (see FIG. 5). With the use of the index plates 31A and 31B, the ball ramp mechanism 19 is activated whenever there is a speed differential between the input shaft 6 and the output shaft 8 irregardless of the direction of the torque flow even though the control plate grooves 35A, 35B, 35C and the activation plate grooves 37A, 37B, 37C are unidirectional in that only rotation of the control ring 20 relative to the activation ring 32 in one direction will result in an increase in the separation distance 44.

Figure 2:
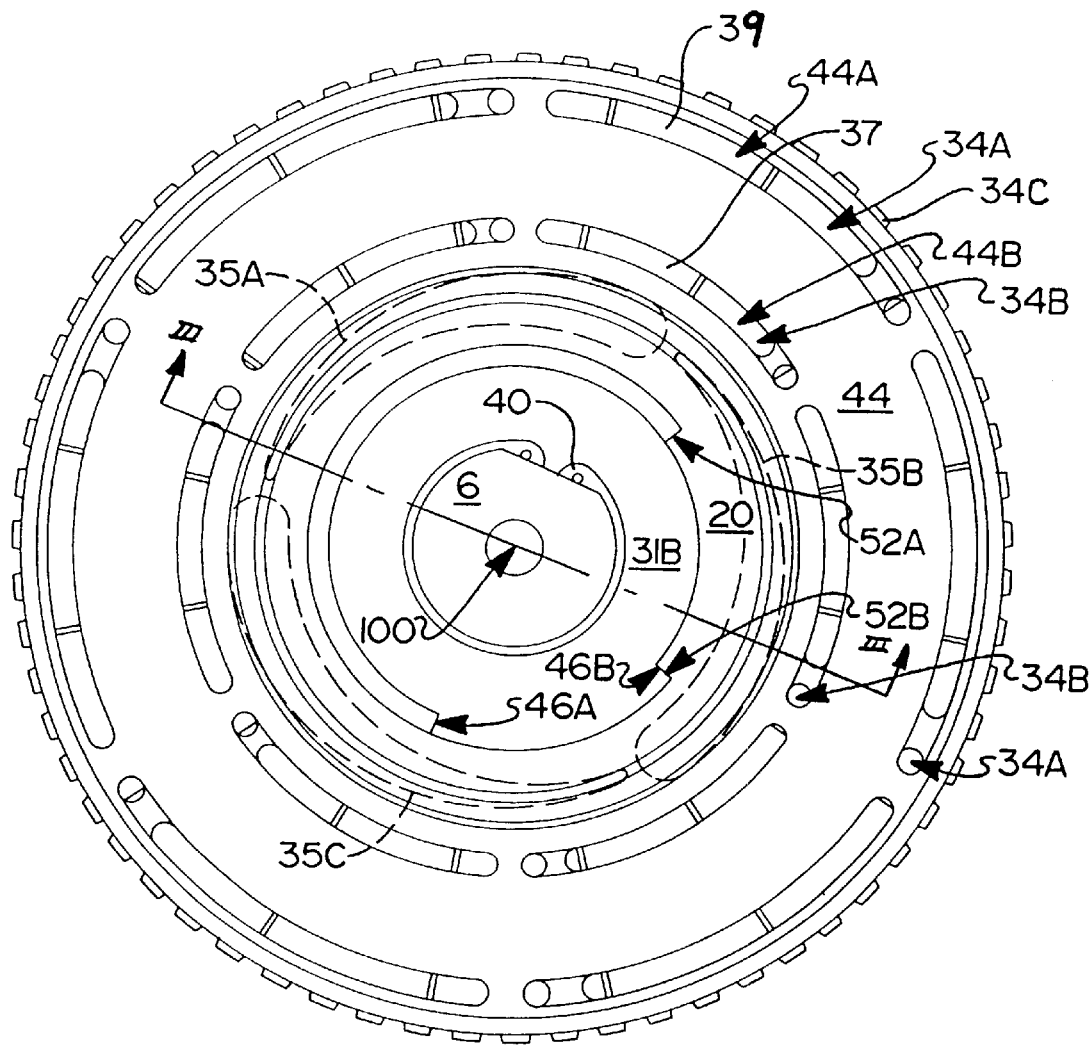
FIG. 2 is a sectional view of the clutch assembly of the present invention taken along line II—II of FIG. 1.

Thus, as shown in FIG. 2, the maximum rotation of the control ring 20 relative to the second index plate 31B is approximately 240 degrees. Since the second index plate 31B is nonrotatably fixed to the input shaft 6, through splines 36, the maximum relative rotation of the control ring 20 relative to the input shaft 6 is also limited by the second index plate 31B. In a similar manner to the operation of the second index plate 31B, the first index plate 31A limits the rotation of the activation ring 32 relative to the input shaft 6 when the first index stop 54A contacts the first activation stop 56A (see FIG. 5). A second index plate 31B contacts thrust bearing 33D which, in turn, contacts the control ring 20. Both the first and second index plates 31A, 31B are nonrotationally coupled to the input shaft 6 with splines 36. Intermediate plate 34 is connected to the output shaft 8 through the clutch hub 14 while the activation ring 32 and the control ring 20 are through the steps 46A, 46B, 54A, 54B and stops 52A, 52B, 56A, 56B keyed to the input shaft 6 via the index plates 31A, 31B.

With the use of the index plates 31A and 31B, the ball ramp mechanism 19 is activated whenever there is a speed differential between the input shaft 6 and the output shaft 8 irregardless of the direction of the torque flow through the clutch assembly 2 even though the control plate grooves 35A, 35B, 35C and the activation plate grooves 37A, 37B, 37C are unidirectional.

The pressure plate 22 is attached to the activation extension 24. As the activation plate 32 is displaced to the right by an increase in separation distance between the control ring 20 and the activation ring 32, the clutch pack 26 is squeezed by the pressure plate 22 and the drive discs 30 frictionally contact and are frictionally coupled to the driven discs 28. In this manner, where the ball ramp mechanism 19 is energized, the input shaft 6 is frictionally rotationally coupled to the output shaft 8.

The axial thrust of the clutch hub 14 is borne by the thrust bearing 33A which rides against the input shaft 6. The activation extension 24 is axially positioned against the thrust bearing 33B which, in turn, contacts a face of the first index plate 31A. A thrust bearing 33C is positioned between the first index plate 31A and the activation ring 32.

The intermediate plate 34 is splined to the clutch hub 14 to rotate therewith but allowed to move in an axial direction. The intermediate plate 34 is interposed between an activation plate 39 and a control plate (or armature) 44 where the control plate 44 is attached to the control ring 20 and thus its rotation relative to the input shaft 6 is also limited by the second index plate 31B. For purposes of this disclosure the element 44 can be referred to as a "control plate" or an "armature" which is connected to, or one piece with the control ring 20.

The activation ring 32 is splined to rotate with the slip sleeve 27 which is splined to rotate with the activation plate 39. Slip sleeve 27 functions such that when activation ring 32 axially moves to clamp the clutch pack 26 it doesn't drag activation plate 39 with it. Thus, slip sleeve 27 allows activation ring 32 to move axially independently of activation plate 39 but joins the two in a rotational sense. The slip sleeve 27 is retained axially relative to control ring 20 by sump ring 27A but allowed to rotate relative to control ring 20. The activation ring 32 can rotate and axially move relative to the input shaft. 6. Also, the control ring 20 can rotate relative to the input shaft 6 and relative to the activation plate 39. Both the control ring 20 and the activation ring 32 are limited in their degree of rotation by the index plates 31B and 31A respectively which are splined to the input shaft 6. Index plate 31A is trapped between the thrust bearings 33B and 33C and limits the rotation of the activation ring 32 relative to the input shaft 6. Index plate 31B is trapped between the thrust bearing 33D and snap ring 40 thereby fixing the axial position of the control ring 20.

The coil assembly 42 is comprised of a multiple turn coil 48 which is partially surrounded by and attached to a stator 49. Both the coil 48 and the stator 49 remain stationary relative to the housing 10 where the stator 49 is attached to the face plate 5. The control plate (or armature) 44 is attached to and rotates with the control ring 20 with a slight clearance between the armature 44 and the stator 49. When the coil 48 is electrically energized by the control unit 50 through signal wires 51, an electromagnetic field is established in the stator 49 which is transferred to the armature 44 which, in turn, electromagnetically attracts the intermediate plate 34 and the activation plate 39. The armature 44, intermediate plate 34 and activation plate 39 may have friction material attached to at least one of their respective faces where they make contact with an adjacent element although the preferred embodiment does not make use of a friction material or the armature 44, or the intermediate or on the activation plate 39. Thus, a layer of friction material can be used to provide the frictional interface between, for example, the armature 44 and the intermediate plate 34 although it is not used in this preferred embodiment. As the electrical current in the coil 48 is increased by the control unit 50, the strength of the electromagnetic field induced in the armature 44 is increased and the electromagnetic attraction between the armature 44 and the intermediate plate 34 and the activation plate 39 increases. In a certain mode of operation, the activation plate 39 slips relative to the intermediate plate 34 and in another mode of operation the armature 44 slips relative to the intermediate plate 34. In operation, that slippage can switch between the two modes depending on the direction of the torque flow through the clutch assembly 2.

If the input shaft 6 is rotating at a slower speed the output shaft 8, this produces a torque on the control ring 20 and the activation ring 32 in either direction as needed to further activate the ball ramp mechanism 19 thereby increasing the separation distance between the control ring 20 and the activation ring 32 to axially move the pressure plate 22 and increase the clamp force on the clutch pack 26. The control ring 20 is either against its index plate step or being driven by clutch hub 14 through frictional interaction between the intermediate plate 34 and the control plate 44 or between the intermediate plate 34 and the activation plate 39. Thus, the clamping load on the clutch pack 26 will be increased due to the rotational limiting action of the first and second index plates 31A and 31B.

Flux slots 44A and 44B are formed in the armature 44 to enhance the magnetic field properties of the coil assembly 42. Likewise, magnetic flux slots 34A, 34B are formed in the intermediate plate 34 and one central flux slot 39A is formed in the activation plate 39. These flux slots 44A, 44B, 34A, 34B and 39A combine to enhance the magnetic flux properties of the armature 44, the intermediate plate 34 and the activation plate 39 when the coil 48 is electrically energized.

A fluid pump 38 functions to force a lubricant into the clutch assembly 2 for cooling and lubrication of the various components. The fluid pump 38 can be a gerotor pump as shown or any other type of suitable pump device. The lubricant used for a gear shift transmission could be used for this purpose where the fluid pump 38 also functions to force lubricant into various parts of the transmission as part of a dry sump or wet sump oiling system. The fluid pump 38 provides a flow of lubricating and cooling lubricant to the clutch assembly 2 which is routed from port 41 into the lubricant distribution channel 100 through the lubricant feed ports 70. The lubricant distribution channel 100 distributes the fluid to the various components of the clutch assembly 2. The fluid port 41 allows lubricant to flow into the fluid pump 38.

Now referring to both FIG. 1 and FIG. 2 of the drawings, where FIG. 2 is an elevational view of a portion of the clutch assembly 2. The elevational view of FIG. 2 is taken looking into the armature 44 from the right side to the left with the faceplate 5 and coil 48 removed from the clutch assembly 2. Slots 44A and 44B formed in the armature 44 are clearly shown in this view. Also, more clearly shown are portions of the corresponding slots 34A and 34B formed in the intermediate plate 34.

Now referring to FIG. 3 of the drawings, more clearly illustrated are the control grooves 35A, 35B, 35C formed in the control ring 20 and the activation grooves 37A, 37B, 37C formed in the activation ring 32. The control grooves 35A, 35B, 35C at least partially oppose the activation grooves 37A, 37B, 37C and both are of variable depth increasing from one end to the other and extending in opposite relative directions. Rolling elements 45A, 45B, 45C simultaneously contact and roll along respective opposed control grooves 35A, 35B, 35C and activation grooves 37A, 37B, 37C. The rolling elements 45A, 45B, 45C are shown in FIG. 3 in a nonactivated position where each contacts a respective control and activation groove 35A, 35B, 35C; 37A, 37B, 37C at their lowest depth (and minimum overlap) thereby minimizing the axial separation distance 47. As the ball ramp mechanism 19 is activated by electronically energizing the coil 48, assuming there exists slippage in the clutch pack 26, the control ring 20 moves counter-clockwise relative to the activation plate 32 thereby causing the rolling elements 45A, 45B, 45C to transverse the three respective pairs of opposed variable depth control grooves 35A, 35B, 35C and activation grooves 37A, 37B, 37C. As the control plate 20 continues to rotate relative to the activation plate 32, the separation distance 47 increases thereby increasing the clamp force on the clutch pack 26.

FIG. 3 shows the ball ramp mechanism 19 in a nonactivated state and FIG. 4 shows the ball ramp mechanism 19 in an activated state at about fifty percent travel. In FIG. 3, the rolling element 45B is positioned at the maximum depth of both the control groove 35B and the opposed activation groove 37B and the separation distance 47 is at a minimum. Reference point 41B is on the activation groove 37B and reference point 43B is on the control groove 35B for use in comparison to their positions in FIG. 4.

In FIG. 4, the rolling element 45B has traversed both the control groove 35B and the activation groove 37B as the control ring 20 has been rotated relative to the activation ring 32. The separation distance 47 has increased since the rolling element 45B is now contacting a more shallow portion of both the control groove 35B and the activation groove 37B. The relative position of reference points 41B and 43B illustrate the relative rotation.

Now referring to FIG. 5, a partial perspective exploded view of the ball ramp mechanism 19 of the present invention is shown. The control ring 20 includes at least three control grooves 35A, 35B, 35C which vary in axial depth according to rotational location on the face of the control ring 20 and oppose respective variable depth activation grooves 37A, 37B, 37C (see FIGS. 3 and 4) with rolling elements 45A, 45B, 45C trapped between the respective grooves 35A, 35B, 35C; 37A, 37B, 37C. The grooves 35A, 35B, 35C and 37A, 37B, 37C are shaped and oriented such that upon rotation of the control ring 20 relative to the activation ring 32, the axial separation distance 47 between the control and activation rings 20, 32 is increased or decreased.

The rotation of the control ring 20 is limited by action of the second index plate 31B which is keyed to rotate with the input shaft 6 with keys 60A and 60B (not shown) which engage splines 36 (see FIG. 1). The rotation of the control ring 20 is stopped relative to the input shaft 6 when either the first index step 46A contacts the first control stop 52A or when the second index step 46B contacts the second control stop 52B (see FIG. 2). Likewise, the rotation of the activation ring 32 is limited by action of the first index plate 31A which is also keyed to rotate with the input shaft 6 with keys 58A and 58B which engage the splines 36. The rotation of the activation ring 32 is stopped relative to the input shaft 6 when either the first index step 54A contacts the first activation stop 56A or when the second index step 54B contacts the second activation stop 56B. Note the rotational orientation of the first and second index plates 31A, 31B where the second index stop 52B of the second index plate 31B is in axial alignment with the first index step 54A of the first index plate 31A. Thus, looking from left to right, the activation ring 32 could rotate approximately 240 degrees clockwise and the control ring 20 could rotate approximately 240 degrees counterclockwise relative to the input shaft 6. The rolling elements 45A, 45B, 45C would traverse their respective control grooves 35A, 35B, 35C and activation grooves 37A, 37B, 37C (not shown) and thereby increase the axial separation distance 47 between the control ring 20 and the activation ring 32 as they rotate relative to each other.

Figure 6:
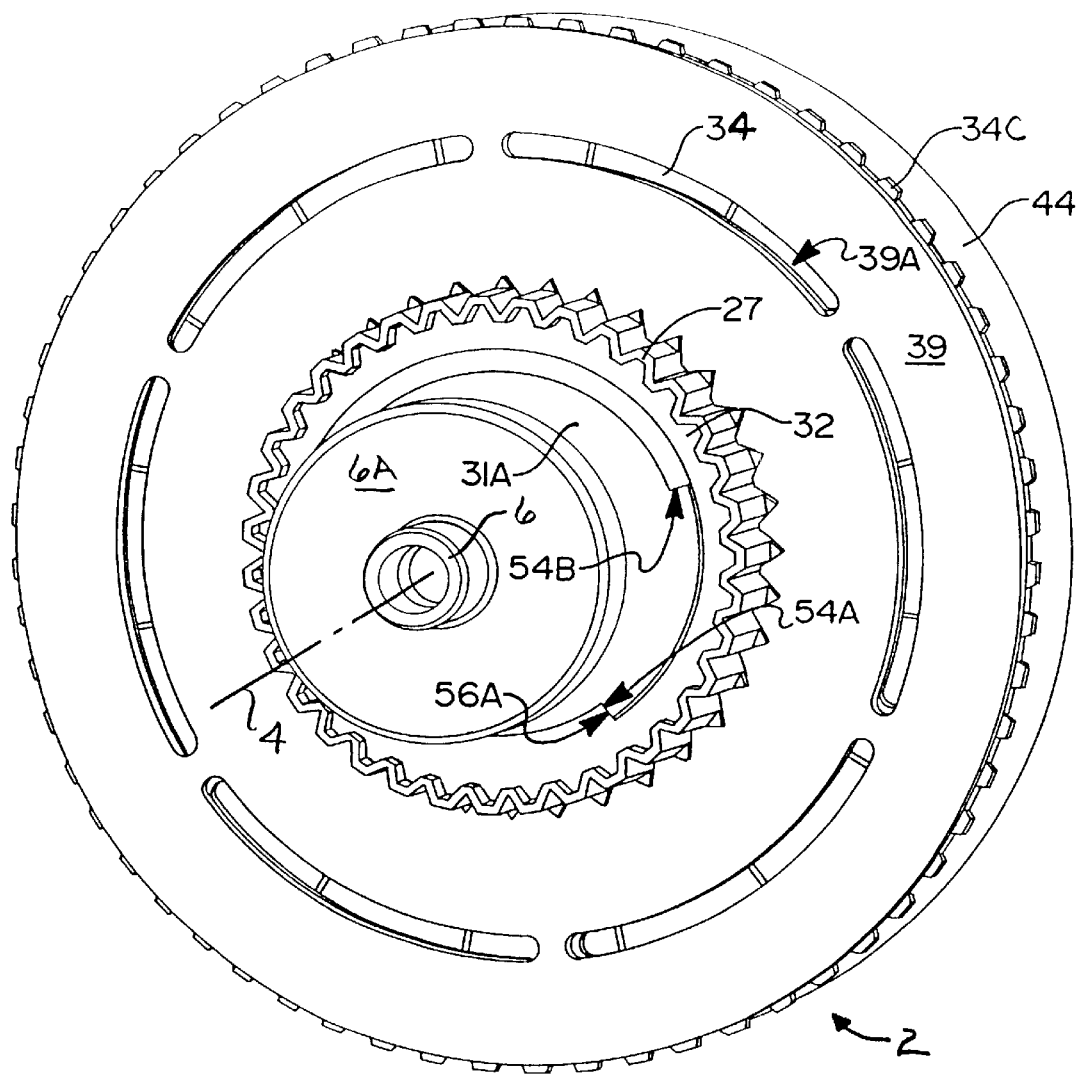
FIG. 6 is a perspective view of a portion of the clutch assembly of FIG. 1.

FIG. 6 is a partial perspective view of the clutch assembly 2 of the present invention looking from left to right as shown in FIG. 1. The axis of rotation 4 extends through the clutch assembly 2 and through the centerline of the input shaft 6. Flange 6A is shown extending from the input shaft 6. The slip sleeve 27 has a multiplicity of tooth shapes formed therein to engage the mating teeth formed in activation ring 32 and found in the activation plate 39. The teeth 34C of the intermediate plate 34 extend to engage the splines 15 formed in the clutch hub 14. A small portion of the intermediate plate 34 is visible through the slot 39A formed in the activation plate 39. The outside surface of the armature 44 is also shown.

Figure 7:
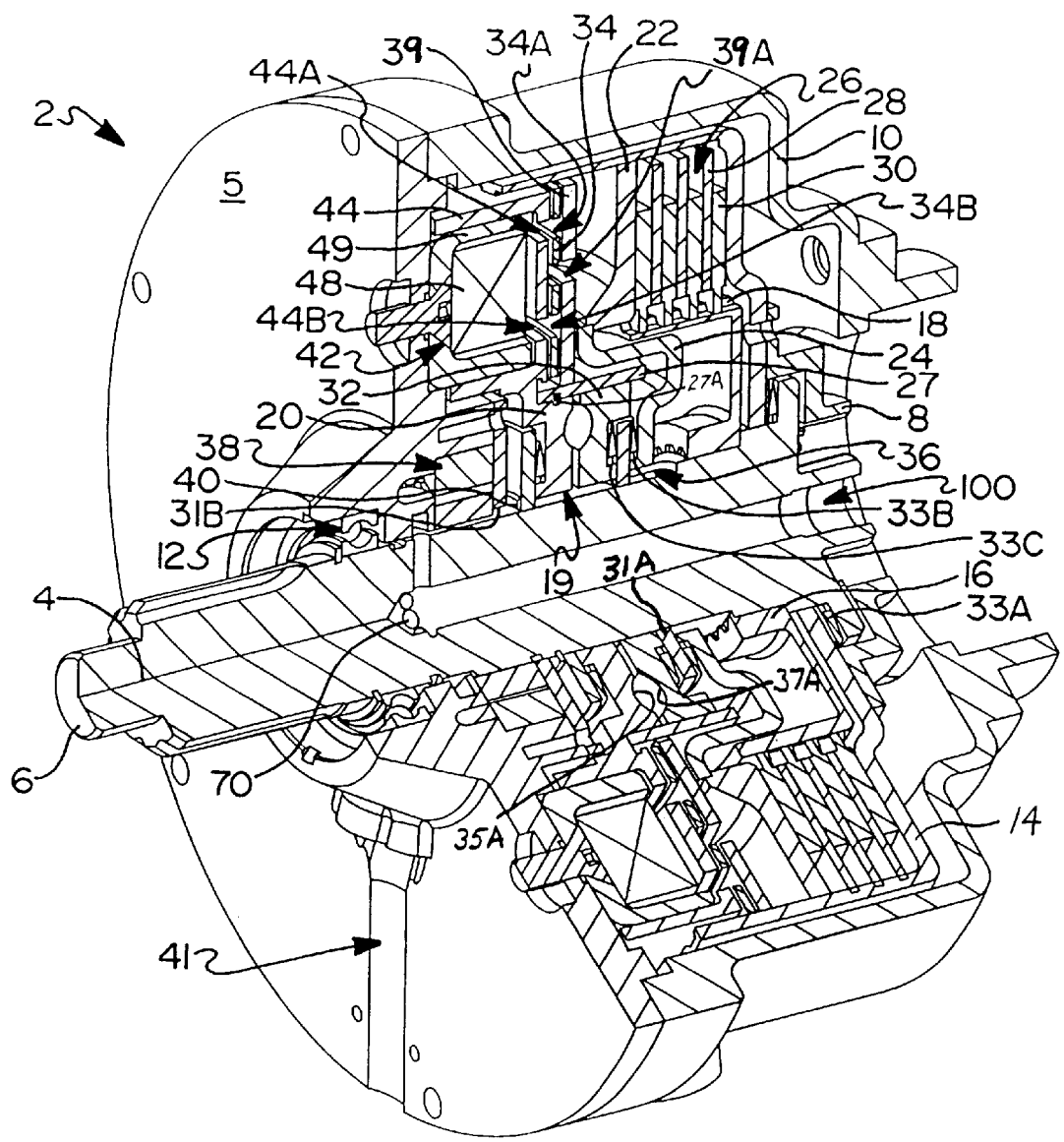
FIG. 7 is a sectional perspective view of the clutch assembly of the present invention.

Now referring to FIG. 7 of the drawings, a cross-sectional perspective view of the clutch assembly 2 of the present invention is shown. An input shaft 6 which rotates about an axis of rotation 4 is normally connected to a power source such as an internal combustion engine (not shown). The clutch assembly 2 functions to frictionally rotationally link the input shaft 6 to an output shaft 8 which, for example, could be the input shaft a change gear transmission. In general, the elements which make up the clutch assembly are annularly shaped and rotate about the axis of rotation 4. The face plate 5 is connected to and together with the housing 10 provides a containment structure for the operating elements and lubricating/cooling fluid of the clutch assembly 2. The face plate 5 is supported by the input shaft 6 through bearing 12. The clutch hub 14 is piloted but not connected to the input shaft 6 and can be connected to some type of driveline device such as a gear change transmission. The housing 10 can be attached to the housing of a gear change transmission (not shown) or other driveline device. Splines 18 formed on a drive hub 16 nonrotatably connect at least one drive disc 30 to the input shaft 6 since the drive hub 16 is attached to the input shaft 6.

The ball ramp mechanism 19 is comprised of a control ring 20, an activation ring 32 and a plurality of rolling elements 45A, 45B, 45C (see FIGS. 3 and 4) positioned to engage opposed variable depth grooves 35A, 35B, 35C, 37A, 37B, 37C formed in both the control ring 20 and variable depth grooves of the activation ring 32. As the control ring 20 is rotated relative to the activation ring 32, the rolling elements 45A, 45B, 45C (see FIGS. 3,4 & 5) transverse the opposed control ring grooves 35A, 35B, 35C and activation ring grooves 37A, 37B, 37C, thereby either increasing or decreasing the separation distance 47 between the control ring 20 and the activation ring 32 depending on the direction of the relative rotation. In a similar manner to the operation of the second index plate 31B, the first index plate 31A limits the rotation of the activation ring 32 relative to the input shaft 6 when the first index step 54A contacts the first activation stop 56A (see FIG. 5). With the use of the index plates 31A and 31B, the ball ramp mechanism 19 is activated whenever there is a speed differential between the input shaft 6 and the output shaft 8 irregardless of the direction of the torque flow through the clutch assembly 2 even though the control plate grooves 35A, 35B, 35C and the activation plate grooves 37A, 37B, 37C are unidirectional. A second index plate 31B contacts thrust bearing 33D which, in turn, contacts the control ring 20. Both the first and second index plates 31A, 31B are nonrotationally coupled to the input shaft 6 with splines 36.

The pressure plate 22 is attached to the activation extension 24. As the activation plate 32 is displaced to the right by an increase in separation distance between the control ring 20 and the activation ring 32, the clutch pack 26 is squeezed by the pressure plate 22 and the drive discs 30 frictionally contact, and are frictionally coupled to the driven discs 28. In this manner, where the ball ramp mechanism 19 is energized, the input shaft 6 is frictionally rotationally coupled to the output shaft 8.

The axial shaft of the clutch hub 14 is borne by the thrust bearing 33A which rides against the input shaft 6. The activation extension 24 is axially positioned against the thrust bearing 33B which, in turn, contacts a face of the first index plate 31A. A thrust bearing 33C is positioned between the first index plate 31A and the activation ring 32.

The intermediate plate 34 is splined to the clutch hub 14 to rotate therewith but allowed to move in an axial direction. The intermediate plate 34 is interposed between an activation plate 39 and an armature 44 where the armature 44 is attached to the control ring 20 and thus its rotation relative to the input shaft 6 also limited by the second index plate 31B. Intermediate plate 34 is connected to the output shaft 8 through the clutch hub 14 while the activation ring 32 and the control ring 20 are keyed to the input shaft 6 via the index plates 31A, 31B and their relative rotation to the input shaft is limited by the steps 46A, 46B, 54, 54B and stops 52A, 52B, 56A, 56B.

The activation ring 32 is splined to rotate with the slip sleeve 27 which is splined to rotate with the activation plate 39. The activation ring 32 can rotate and axially move relative to the input shaft 6. Also, the control ring 20 can rotate relative to the input shaft 6 and relative to the activation plate 39. Both the control ring 20 and the activation ring 32 are limited in the degree of rotation by the index plates 31B and 31A respectfully which are splined to the input shaft 6. Index plate 31A is trapped between the thrust bearings 33B and 33C and limits the rotation of the activation ring 32 relative to the input shaft 6. Index plate 31B is trapped between the thrust bearing 33D and snap ring 40 thereby fixing the axial position. Slip sleeve 27 functions such that when activation ring 32 axially moves to clamp the clutch pack 26 it doesn't drag activation plate 39 with it. Thus, slip sleeve 27 allows activation ring 32 to move axially independently of activation plate 39 but joins the two in a rotational sense. The slip sleeve 27 is retained axially relative to control ring 20 by sump ring 27A but allowed to rotate relative to control ring 20.

The coil assembly 42 is comprised of a multiple turn coil 48 which is partially surrounded by and attached to a stator 49. Both the coil 48 and stator 49 remain stationary relative to the housing 10, where the stator 49 is attached to the face plate 5. The armature (or control plate) 44 is attached to and rotates with the control ring 20 with a slight clearance between the armature 44 and the stator 49. When the coil 48 is electrically energized by the control unit 50, through signal wires 51, an electromagnetic field is established in the stator 49 which is transferred to the armature 44 which in turn electromagnetically attracts the intermediate plate 34 and the activation plate 39.

The armature 44, intermediate plate 34 and activation plate 39 can have friction material attached to at least one of their respective faces where they make contact with an adjacent element. As the electrical current in the coil 48 is increased by the control unit 50, the strength of the electromagnetic field induced in the armature 44 is increased and the electromagnetic attraction between the armature 44 is increased and the electromagnetic attraction between the armature 44 and the intermediate plate 34 and the activation 39 increases. In a certain mode of operation, the activation plate 39 slips relative to the intermediate plate 34 and in another mode of operation the armature 44 slips relative to the intermediate plate 34. That slippage can switch between the two modes so as to provide increased activation of the ball ramp mechanism 19 whenever there is a speed differential between the control ring 20 and the activation ring 32.

If the input shaft 6 is rotating at a slower speed than the output shaft 8, this produces a torque on the control ring 20 and the activation ring 32 in either direction, as needed to further activate the ball ramp mechanism 19 thereby increasing the separation distance between the control ring 20 and the activation ring 32 to axially move the pressure plate 22, and increase the clamp force on the clutch pack 26. The input shaft 6 can rotate in either direction relative to the output shaft 8 and the clamping load on the clutch pack 26 will be increased due to the rotational limiting of the first and second index plates 31A and 31B. Activation plate 39 is rotationally joined to the input shaft 6 via the index plate 31B which in one mode, is against a stop 52A and the control ring 20 and the activation ring 32 are positioned such that the rolling elements 45A, 45B, 45C are at the bottom of their respective grooves while the second index plate is on its stop 56B but in the opposite direction.

Flux slots 44A and 44B are formed in the armature 44 to enhance the magnetic field properties of the coil assembly 42. Likewise, magnetic flux slots 34A, 34B are formed in the intermediate plate 34 and one central flux slot 39A is formed in the activation plate 39. These flux slots 44A, 44B, 34A, 34B and 39A combine to enhance the magnetic flux properties of thee armature 44, the intermediate plate 34 and the activation plate 39 when the coil 48 is electrically energized.

A fluid pump 38 functions to force a lubricant into the clutch assembly 2 for cooling and lubrication of the various components. The fluid pump 38 can be a gerotor pump, as shown on any other type of suitable pump device. The lubricant used for a gear shift transmission could be used for this purpose when the fluid pump 38 also functions to force lubricant into various parts of the transmission as part of a dry sump or wet sump oiling system. The fluid pump 38 provides a flow of lubricating and cooling lubricant to the clutch assembly 2 which is routed from port 41 into the lubricant distribution channel 100 through the lubricant feed port 70. The lubricant distribution channel 100 distributes the fluid to the various components of the clutch assembly.

Figure 8:
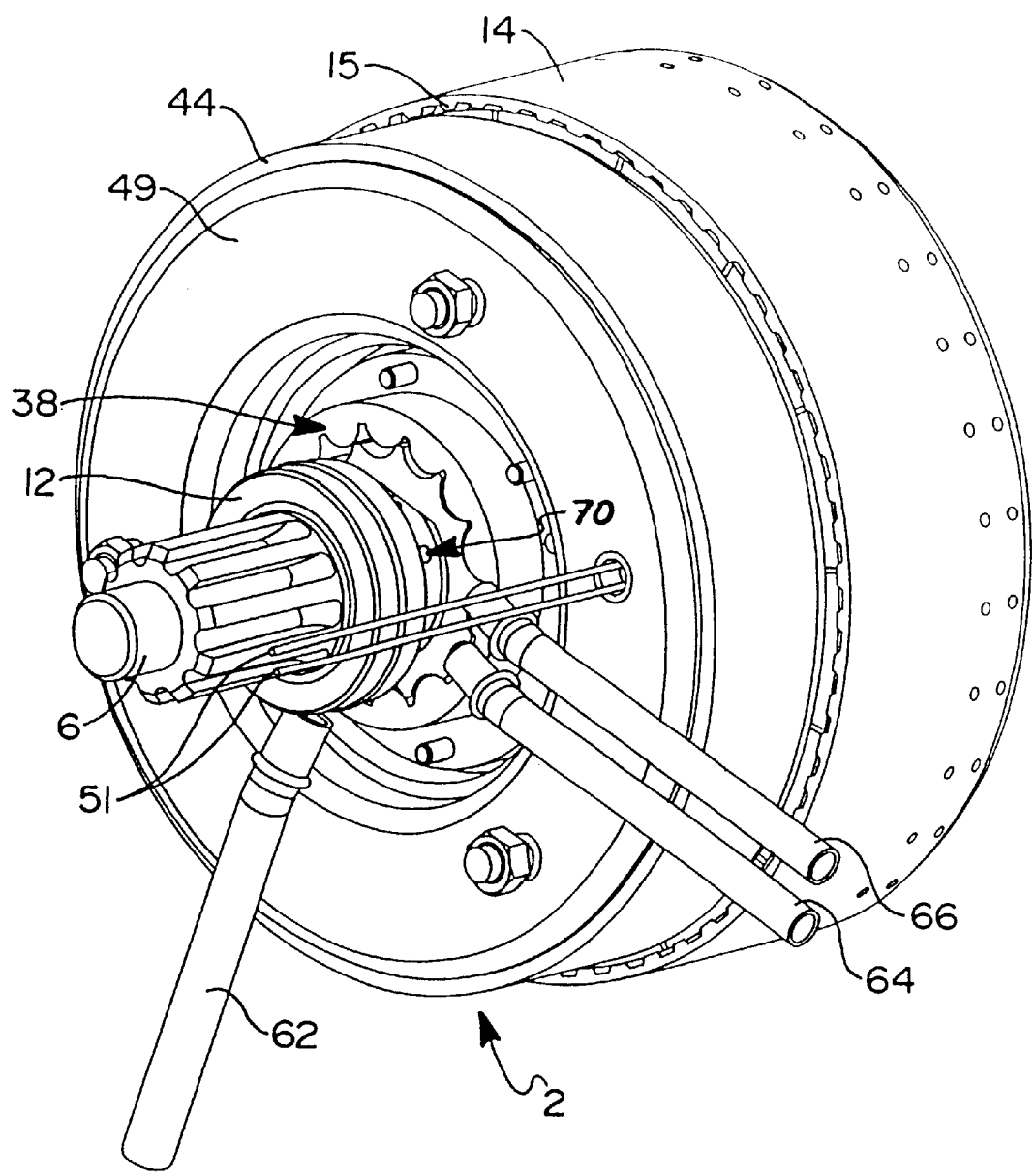
FIG. 8 is a partial perspective view of the clutch assembly of the present invention.

Now referring to FIG. 8 of the drawings, a partial perspective view of the clutch assembly 2 of the present invention is shown. The face plate 5 of the clutch assembly 2 is partially cut away to more clearly show the fluid pump 38 which pumps lubricant from a lubricant sump through lubricant sump line 62 to a lubricant heat exchanger (not shown) through lubricant pump line 64 which when cooled, is returned to the clutch assembly 2 through the lubricant return line 66. The input shaft 6 includes a plurality of lubricant flow apertures that distribute the cooling/lubricating lubricant to various sections of the clutch assembly 2. The fluid pump 38 pumps the lubricating lubricant through at least one lubricant feed port 70 into the lubricant distribution channel 100 (see FIG. 1) for distribution through a plurality of lubricant distribution apertures also (not shown) into the various internal elements of the clutch assembly 2.

Fluid pump 38 functions to provide a pressurized flow of lubricant through the rotating clutch pack 26 and generally, the ball ramp mechanism 19 to provide both a source of cooling and lubrication. Lubricant return line 66 supplies a flow of lubricant from a heat exchanger (not shown) to the pump 38 which pumps lubricant through the interior of the clutch housing 10 and the lubricant is then drained through a separate lubricant sump line 62. The lubricant flows to the clutch assembly 2 through lubricant feed port 70 and flows into the lubricant distribution channel 100 of the input shaft 6 for distribution to the clutch pack 26 through various lubricant apertures (not shown) which are typical illustrative of a well known method to adequately distribute the flow of lubricant. The lubricant sump line 62 extends into a lubricant supply reservoir such as that of a transmission (not shown) and the lubricant is drawn up into the fluid pump 38 where it is pumped to the heat exchanger through lubricant pump line 64 and flows through the heat exchanger and returns to the clutch assembly 2 through the lubricant return line 66.

Operation

Consider the situation when the torque flow is from the input shaft 6 to the output shaft 8 where both the input and output shafts 5 are rotating clockwise as viewed from the input shaft 6 and with the coil assembly 42 in an energized state. This condition, when the clutch assembly 2 is used as a master clutch, is encountered in a typical vehicle acceleration mode. The activation ring 32 is stopped from rotating relative to the input shaft 6 by the first index plate 31A since the first index step 54A contacts the first activation stop 56A formed in the activation ring 32 which is keyed to rotate with the input shaft 6 but allowed to move axially relative thereto. The control ring 20 is allowed to rotate in a clockwise direction relative to the input shaft 6 (and the activation ring 32) as the second control stop 52B moves away from the second index step 46B thereby causing the rolling elements 45A, 45B, 45C to transverse their respective opposing variable depth control and activation grooves 35A, 35B, 35C; 37A, 37B, 37C to increase the separation distance 47. This results in an increase in the clamping load on the clutch pack 26 whenever there is relative rotation between the input shaft 6 and the output shaft 8 up to some maximum value. In a certain mode of operation, the activation plate 39 slips relative to the intermediate plate 34 and in another mode of operation the armature 44 slips relative to the intermediate plate 34. In operation, that slippage can switch between the two modes.

Now consider when the torque flow is reversed and directed from the output shaft 8 to the input shaft 6 and the input and output shafts 6, 8 are still rotating clockwise and the coil assembly 42 remains energized. This condition occurs in a vehicle master clutch application when the vehicle is in a coast mode and the engine is braking the vehicle. The control ring 20 is stopped from rotating relative to the input shaft 6 by the second index plate 31B since the first control step 46B formed in the control ring 20 contacts the second index stop 52B (see FIG. 2). The second index plate 31B is keyed to rotate with the input shaft 6 but is allowing to move axially leftward relative thereto. Axial movement to the right in FIG. 1 is prevented by the snap ring 40. The activation ring 32 is allowed to rotate in a clockwise direction relative to the input shaft 6 (and the control ring 20) as the second activation stop 56B moves away from the second index step 54B (see FIG. 5) thereby causing the rolling elements 45A, 45B, 45C to transverse the opposing variable depth control and activation grooves 35A, 35B, 35C; 37A, 37B, 37C to increase the separation distance 47. In a certain mode of operation, the activation plate 39 slips relative to the intermediate plate 34 and in another mode of operation the armature 44 slips relative to the intermediate plate 34. In operation, that slippage can switch between the two modes. This results in an increase in the clamping load on the clutch pack 26 whenever there is relative rotation between the input shaft 6 and the output shaft 8 up to some maximum value.

In general, the input shaft 6 could be any type of rotational input member connected so as to rotate the first and second index plates 31A, 31B and the armature 44 and the drive hub 16. Also, the output shaft 8 could be any type of suitable rotational output member connected to rotate with the clutch hub 14. The clutch assembly 2 of the present invention works even if the input shaft 6 and the output shaft 8 are reversed in function.

Although this invention has been described in its preferred form with a certain degree of particularity, it is understood that the present disclosure of the preferred form has been made only by way of example in that numerous changes in the details and construction and combination and arrangement of parts may be resorted to without departing from the spirit and the scope of the invention as now claimed.

What is claimed is:

1. A clutch assembly for rotationally coupling two rotatable shafts comprising:
    an input shaft rotating about an axis of rotation;
    an output shaft having an axis of rotation;
    a ball ramp mechanism for generating a clamping force comprising; an annular control ring having an axis or rotation, said control ring having a plurality of circumferential control grooves formed in a face of said control ring, said control grooves varying in axial depth, an equivalent number of rolling elements one occupying each of said control grooves, an activation ring having an axis of rotation coaxial with said axis of rotation of said control ring, said activation ring having a plurality of activation grooves substantially identical in number, shape and radial position to said control grooves where said activation grooves at least partially oppose said control grooves and where each of said rolling elements is contained between one of said activation grooves and a respective control groove, said control ring being axially and rotationally moveably disposed relative to said activation ring, said control ring having an annular control plate radially extending therefrom and said activation ring having an annular activation plate radially extending therefrom;
    an annular intermediate plate nonrotatably connected to said output shaft and disposed between said control plate and said activation plate;
    a coil for creating of an electromagnetic field in an armature upon introduction of an electrical current in said coil where said armature connected to said control ring;
    a clutch pack for frictionally rotatably connecting said input shaft to said output shaft upon application of said clamp load generated by said ball ramp mechanism;
    at least one index plate acting to limit the rotation of said control ring relative to said activation ring;
    where upon introduction of an electrical current in said coil an electromagnetic field is generated to frictionally couple said coil pole to said control plate and said control plate to said intermediate plate and said intermediate plate to said activation plate.

2. The clutch assembly of claim 1 wherein a first index ring controls the rotation of said activation ring and a second index ring controls the rotation of said control ring.

3. The clutch assembly of claim 1 wherein said first and second index plates are nonrotatably connected to said input shaft.

4. The clutch assembly of claim 1 wherein said index plate has a step formed therein which contacts a stop formed in said control ring so as to limit the rotation of said control ring relative to said index plate.

5. The clutch assembly of claim 1 wherein said index plate has a step formed therein which contacts a stop formed in said activation ring so as to limit the rotation of said control ring relative to said index plate.

6. The clutch assembly of claim 1 wherein said control ramps and said activation grooves are unidirectional.

7. The clutch assembly of claim 1, further comprising a plurality of circumferentially extending slots formed in said intermediate plate.

8. The clutch assembly of claim 1, further comprising a plurality of circumferentially extending slots formed in said control plate.

9. The clutch assembly of claim 1, further comprising a plurality of circumferentially extending slots formed in said activation plate.

10. The clutch assembly of claim 1, further comprising a plurality of circumferentially extending slots formed in said coil armature.

11. The clutch assembly of claim 1, further comprising a plurality of circumferentially extending slots formed in said coil armature and in said control extension and in said intermediate ring and in said activation extension.

12. The clutch assembly of claim 1, further comprising a lubricant pump rotatably driven by said input shaft thereby forcing a lubricant through said clutch assembly.

13. The clutch assembly of claim 1, further comprising slide sleeve, said slide sleeve connected to said activation ring and to said activation plate allowing relative axial movement therebetween without relative rotation.

14. A clutch assembly for rotationally coupling two rotatable shafts comprising:
   an input shaft rotating about an axis of rotation;
   an output shaft having an axis of rotation;
   a ball ramp mechanism for generating a clamping force comprising; an annular control ring having an axis of rotation, said control ring having a plurality of circumferential control grooves formed in a face of said control ring, said control ring varying in axial depth, an equivalent number of rolling elements one occupying each of said control grooves, an activation ring having an axis of rotation coaxial with said axis of rotation of said control ring, said activation ring having a plurality of activation grooves substantially identical in number, shape and radial position to said control grooves where said activation grooves at least partially oppose said control grooves and where each of said rolling elements is contained between one of said activation grooves and a respective control groove, said control ring being axially and rotationally moveably disposed relative to said activation plate, said control ring having an annular control plate radially extending therefrom and said activation ring having an annular activation plate radially extending therefrom;
   an annular intermediate plate nonrotatably connected to said output shaft and disposed between said control plate and said activation plate;
   a coil for creating of an electromagnetic field in a coil pole and in an armature upon introduction of an electrical current in said coil where said armature is connected to said control ring;
   a clutch pack for frictionally rotatably connecting said output shaft to said input shaft upon application of said clamp load generated by said ball ramp mechanism;
   a first index plate acting to limit the rotation of said activation ring relative to said input shaft;
   a second index plate acting to limit the rotation of said control ring relative to said input shaft;
   where upon introduction of an electrical current in said coil an electromagnetic field is generated to frictionally couple said armature to said control plate and said control plate to said intermediate plate and said intermediate plate to said activation plate.

15. The clutch assembly of claim 14 wherein said first index plate has a stop formed therein which contacts a stop formed in said activation ring so as to limit the rotation of said activation ring relative to said first index plate.

16. The clutch assembly of claim 14 wherein said second index plate has a stop formed therein which contacts a stop formed in said control ring so as to limit the rotation of said control ring relative to said second index plate.

17. The clutch assembly of claim 14 wherein said control grooves and said activation grooves are unidirectional.

18. The clutch assembly of claim 14, further comprising a plurality of circumferentially extending slots formed in said intermediate plate.

19. The clutch assembly of claim 14, further comprising a plurality of circumferentially extending slots formed in said control plate.

20. The clutch assembly of claim 14, further comprising a plurality of circumferentially extending slots formed in said activation plate.

21. The clutch assembly of claim 14, further comprising slide sleeve, said slide sleeve connected to said activation ring and to said activation plate allowing relative axial movement therebetween without relative rotation.

22. The clutch assembly of claim 14, further comprising a plurality of circumferentially extending slots formed in said control plate and in said intermediate plate and in said activation plate.

23. The clutch assembly of claim 1, further comprising a lubricant pump rotatably driven by said output shaft thereby forcing a lubricant through said clutch assembly.

24. The clutch assembly of claim 23, further comprising a plurality of lubricant distribution apertures connected to a shaft cavity where said lubricant pump forces lubricant into said shaft cavity and into said lubricant distribution apertures.

25. A clutch assembly for rotationally coupling two rotatable shafts comprising:
   an input shaft rotating about an axis of rotation;
   an output shaft having an axis of rotation;
   a ball ramp mechanism for generating a clamping force comprising; an annular control ring having an axis of rotation, said control ring having a plurality of circumferential control grooves formed in a face of said control ring, said control grooves varying in axial depth, an equivalent number of rolling elements one occupying each of said control grooves, an activation ring having an axis of rotation coaxial with said axis of rotation of said control ring, said activation ring having a plurality of activation grooves substantially identical in number, shape and radial position to said control grooves where said activation grooves at least partially oppose said control grooves and where each of said rolling elements is contained between one of said activation grooves and a respective control grooves, said control ring being axially and rotationally moveably disposed relative to said activation plate, said control ring having an annular control plate radially extending therefrom and said activation ring having an annular activation plate radially extending therefrom;
   at least one index plate acting to limit the rotation of said control ring relative to said activation ring;
   a coil for creating of an electromagnetic field in an armature upon introduction of an electrical current in said coil where said armature is connected to said control ring;
   a clutch pack for frictionally rotatably connecting said input shaft to said output shaft upon application of said clamp load generated by said ball ramp mechanism;
   where upon introduction of an electrical current in said coil an electromagnetic field is generated to frictionally couple said control ring to said activation ring.

26. The clutch assembly of claim 25 wherein a first index plate controls the rotation of said activation ring and a second index plate controls the rotation of said control ring relative to said input shaft.

27. The clutch assembly of claim 26 wherein said first and second index plates are nonrotatably connected to said input shaft.

28. The clutch assembly of claim 25 wherein said index plate has a step formed therein which contacts a respective stop formed in said control ring so as to limit the rotation of said activation ring relative to said index plate.

29. The clutch assembly of claim 25 wherein said index plate has a step formed therein which contacts a respective stop formed in said activation ring so as to limit the rotation of said activation ring relative to said index plate.

30. The clutch assembly of claim 25 wherein said control grooves and said activation grooves are unidirectional.

* * * * *